Figure 1:
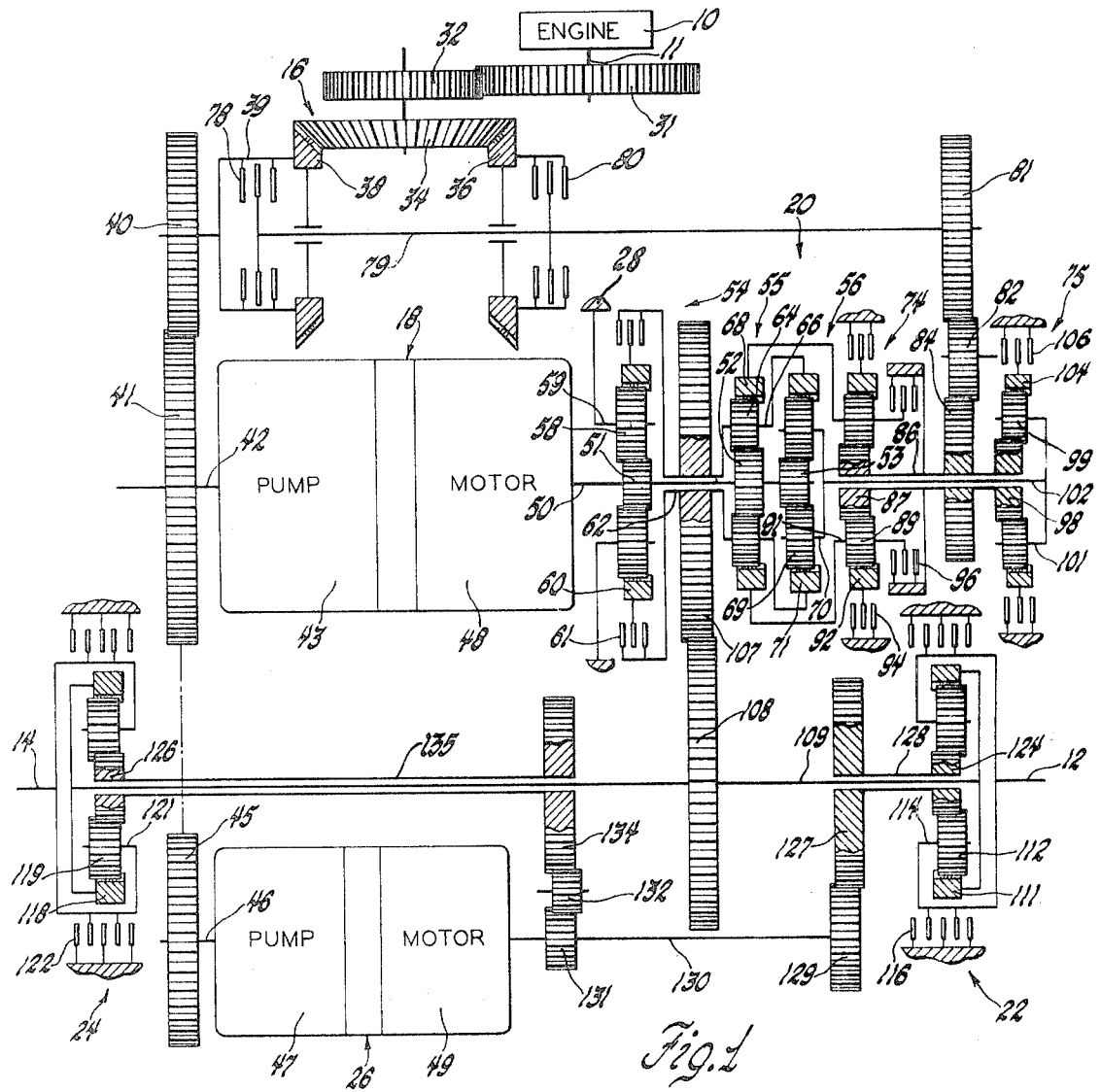

United States Patent

[11] 3,596,535

[72] Inventor James C. Polak
 Indianapolis, Ind.
[21] Appl. No. 855,147
[22] Filed Sept. 4, 1969
[45] Patented Aug. 3, 1971
[73] Assignee General Motors Corporation
 Detroit, Mich.

[54] TRANSMISSION PROVIDING HYDROSTATIC
 DRIVE AND HYDROMECHANICAL DRIVE
 8 Claims, 2 Drawing Figs.
[52] U.S. Cl. .................................................. 74/720.5,
 74/687
[51] Int. Cl. ........................................ F16h 37/06,
 F16h 47/04
[50] Field of Search ............................................. 74/720.5,
 687

[56] References Cited
UNITED STATES PATENTS

| 3,446,093 | 5/1969 | Orshansky, Jr. | 74/687 |
| 3,426,621 | 2/1969 | Mooney, Jr. et al. | 74/720.5 |
| 3,455,183 | 7/1969 | Orshansky, Jr. | 74/687 |
| 3,492,891 | 2/1970 | Livezey | 74/687 X |

Primary Examiner—Leonard H. Gerin
Attorneys—W. E. Finken, A. M. Heiter and R. L. Phillips ABSTRACT: A transmission having a hydrostatic propulsion drive unit combined with planetary gearing to provide in both forward and reverse a full hydrostatic drive in a low speed range and three hydromechanical drives in successively higher speed ranges with synchronous drive establishing device shifting, the transmission with dual output also having a separate hydrostatic steer drive unit combined with the gearing to provide steering.

INVENTOR
James C. Polak
BY
Ronald L. Phillips
ATTORNEY

TRANSMISSION PROVIDING HYDROSTATIC DRIVE AND HYDROMECHANICAL DRIVE

This invention relates to vehicle transmissions and more particularly to a transmission providing full hydrostatic drive and hydromechanical drive.

The transmission according to the present invention, as illustrated in the preferred embodiment which has dual output for use in a track-laying vehicle, provides the same four speed range drives in forward and reverse with full hydrostatic drive in the lowest speed range and split torque or hydromechanical drive in three successively higher speed ranges with hydrostatic steering provided in all speed ranges. Propulsion drive is by a single hydrostatic propulsion drive unit acting with planetary range gearing which provides synchronized drive establishments at optimum shift points. In the planetary range gearing, one planetary gear set provides for the lowest speed range drive which is the full hydrostatic drive, and two other planetary gear sets provide for combining drive from the hydrostatic propulsion drive unit with selective mechanical input drives via other planetary gearing to provide for the hydromechanical drives. The planetary gear set providing for the lowest speed range drive effects reduction in the operating speeds of the hydrostatic propulsion drive unit as compared with use of one of the other gear sets to provide this drive and while retaining the same operating abilities. The single output from the above arrangement is delivered to like planetary steer units which also serve as output gearing and deliver their separate outputs as propulsion drives to the vehicle's two tracks. Steering is provided by an input driven hydrostatic steer drive unit which provides drive to the planetary steer units to effect controlled differential steering.

An object of the present invention is to provide a new and improved transmission.

Another object is to provide a transmission providing a full hydrostatic drive via one planetary gear set and a plurality of hydromechanical drives by other planetary gearing with synchronous drive establishment for shifting drives.

Another object is to provide in a dual output transmission a single hydrostatic propulsion drive unit cooperating with planetary gearing including output gearing to provide a full hydrostatic drive in a low speed range and cooperating with other planetary gearing including the output gearing to provide a plurality of hydromechanical drives in successively higher speed ranges with range shifting accomplished by drive establishing devices speed synchronized at optimum shift points and a single hydrostatic steer unit cooperating with the output gearing to provide differential steering in all the drives.

These and other objects of the invention will be more apparent from the following description and drawing in which:

FIG. 1 diagrammatically shows a dual output transmission according to the present invention.

Figure 2:
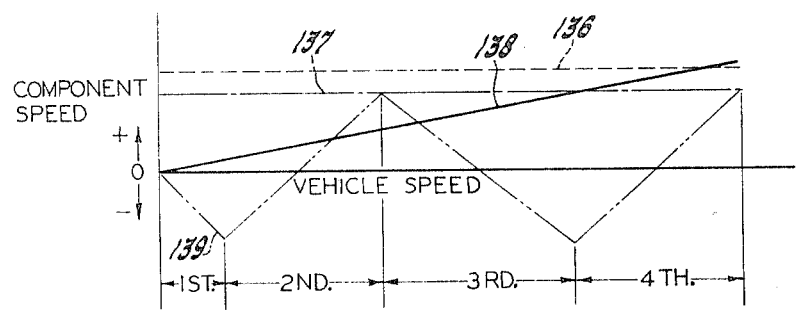

FIG. 2 graphically shows typical speed characteristics of certain transmission components.

The preferred embodiment of the transmission according to the present invention has dual output and provides the same four speed range drives in forward and reverse with full hydrostatic drive in the lowest speed range and split torque or hydromechanical drive in three successively higher speed ranges. These propulsion drives are accomplished by a single hydrostatic propulsion drive unit cooperating with planetary gearing and steering is obtained with a hydrostatic steer drive which cooperates with the gearing, steering being of the controlled differential type.

Referring to FIG. 1, the preferred embodiment of the transmission according to the present invention is for operatively drivingly connecting a track-laying vehicle's engine 10 to the vehicle's two tracks. The transmission generally comprises an engine powered input shaft 11 powering a right and a left track-powering transmission output shaft 12 and 14 through a forward and reverse drive unit 16, a single hydrostatic propulsion drive unit 18, a synchronous shifting planetary gearing arrangement 20 and a right and a left speed differential or steer planetary gear unit 22 and 24. A single hydrostatic steer drive unit 26 is combined with the steer units 22 and 24 for the steering operation. All of these components are suitably supported in a housing 28. Both hydrostatic drive units may be of conventional design with each unit's pump having infinitely variable displacement and each unit's motor having either fixed or variable displacement, the speed and direction of the motor output being controlled by the hydrostatic drive units's displacement control mechanism which may also be conventional.

Input to both the hydrostatic propulsion drive unit 18 and the hydrostatic steer drive unit 26 is provided by the input shaft 11 being connected to drive a spur gear 31. Gear 31 meshes with a spur gear 32 which is connected to drive a bevel gear 34 in the forward and reverse drive unit 16. Gear 34 meshes at diametrically opposite sides with a bevel gear 36 and a bevel gear 38. Continuous input drive to both of the hydrostatic drive units is provided by connecting the bevel gear 38 via a drum 39 to a spur gear 40. Gear 40 meshes with a spur gear 41 which is connected by a shaft 42 to drive pump 43 of the hydrostatic propulsion drive unit 18. Gear 41 meshes, as shown diagrammatically, with a spur gear 45 which is connected by a shaft 46 to drive pump 47 of the hydrostatic steer drive unit 26. Motors 48 and 49 of the respective hydrostatic drive units 18 and 26 may thus be powered by the engine.

Describing the propulsion portion of the transmission arrangement in further detail, the motor 48 of the hydrostatic propulsion drive units 18 has its output shaft 50 connected to drive sun gears 51, 52 and 53 of planetary gear sets 54, 55 and 56, respectively, in the planetary gearing arrangement 20. In planetary gear set 54, sun gear 51 meshes with pinions 58 carried by a carrier 59 which is permanently grounded to the transmission housing 28. Pinions 58 mesh with a ring gear 60 which may be connected through engagement of a clutch 61 to a sleeve shaft 62 which is arranged about the motor output shaft 50 and directly receives all the drives provided by the hydrostatic propulsion drive unit 18 and planetary gearing arrangement 20 as discussed in more detail later.

In gear set 55, sun gear 52 meshes with pinions 64 carried by a carrier 66 which is connected to shaft 62. Pinions 64 mesh with a ring gear 68 which may be mechanically input driven as described in more detail later. In gear set 56, sun gear 53 meshes with pinions 69 carried by a carrier 70 which may be mechanically input driven as described in more detail later. Pinions 69 mesh with a ring gear 71 which is connected to carrier 66 of gear set 55 and is thus connected to shaft 62.

Mechanical drives to gear sets 55 and 56 are provided by the forward and reverse drive unit 16 and planetary gear sets 74 and 75 in planetary gearing arrangement 20. The forward and reverse drive unit 16 has, in addition to those components previously described, a reverse drive clutch 78 whose drive members are connected to drum 39 and are thus connected to rotate with bevel gear 38. The driven member of reverse drive clutch 78 is connected to the left-hand end of a countershaft 79 which extends freely through bevel gear 38 and also through the opposed bevel gear 36 as shown. A forward drive clutch 80 has its drive members secured to bevel gear 36 and its driven member connected to countershaft 79 at an intermediate point. Thus when the reverse drive clutch 78 is engaged, the countershaft 79 is powered by the transmission input in one direction and, alternatively, when the forward drive clutch 80 is engaged, the countershaft 79 is powered in the opposite direction.

Further describing the mechanical drives to gear sets 55 and 56, a spur gear 81 is connected to the right-hand end of countershaft 79 and meshes with an idler gear 82. Idler gear 82 meshes with a spur gear 84 which is connected to a sleeve shaft 86. The sleeve shaft 86 is connected at its left-hand end to sun gear 87 of gear set 74. Sun gear 87 meshes with pinions 89 carried by a carrier 91. Carrier 91 is connected to ring gear 68 of gear set 55 and may also be selectively connected by a clutch 96 to sleeve shaft 86. Pinions 89 mesh with a ring gear 92 which may be held by engagement of a brake 94. The sleeve shaft 86 is also connected to sun gear 98 of gear set 75. Sun gear 98 meshes with pinions 99 carried by a carrier 101. Carrier 101 is connected to the right-hand end of a shaft 102 which extends through sleeve shaft 86 and is connected at its left-hand end to carrier 70 of gear set 56. Pinions 99 mesh with a ring gear 104 which may be held by engagement of a brake 106.

Drive to the transmission's two output shafts 12 and 14 is provided by connecting sleeve shaft 62 to a spur gear 107. Gear 107 meshes with a spur gear 108 which is connected to a shaft 109. In the drives to the two output shafts 12 and 14, the right-hand end of shaft 109 is connected to ring gear 111 of the right steer planetary gear unit 22 which ring gear meshes with pinions 112 carried by a carrier 114 that is connected to the right output shaft 12. A vehicle brake 116 is connected to brake the right output shaft 12. Similarly, the left-hand end of shaft 109 is connected to ring gear 118 of the left steer planetary gear unit 24 which ring gear meshes with pinions 119 carried by a carrier 121 that is connected to the left output shaft 14, the left output shaft 14 being axially aligned with the right output shaft 12. A vehicle brake 122 is connected to brake the left output shaft 14. Sun gear 124 of the right steer unit 22 and sun gear 126 of the left steer unit 24 are operatively connected by a direction reversing gear train. This gear train comprises a spur gear 127 which is connected by a sleeve shaft 128 to sun gear 124 and is in mesh with a spur gear 129. Gear 129 is connected to the right-hand end of a shaft 130. Shaft 130 is connected near its left-hand end to a spur gear 131 which meshes with an idler gear 132. Idler gear 132 meshes with a spur gear 134 which is connected by a sleeve shaft 135 to sun gear 126 of the left steer unit 24. Thus, this gear train with idler gear 132 will provide reaction to the sun gears 124 and 126 when the ring gears 111 and 118 are driven. For steering, the shaft 130 of this gear train is connected at its left-hand end to be driven by motor 49 of the hydrostatic steer drive unit 26.

Describing now a typical operation of this dual output transmission, for neutral either the forward drive clutch 80 or reverse drive clutch 78 may be engaged and all other drive establishing devices are disengaged to disconnect all power paths from the output shafts. In neutral, both of the hydrostatic drive units 18 and 26 are conditioned by their displacements so that they do not produce hydrostatic drive. Thus, in neutral both pumps 43 and 47 are motored by the engine 10 so that the hydrostatic propulsion drive unit 18 is readied for subsequent drive operation and the hydrostatic steer unit 26 is then available for steering which will now be described for this transmission condition.

In neutral, with no drive to shaft 62 and on operation of the hydrostatic steer drive unit 26 to power shaft 130 in either direction, the ring gears 111 and 118, since they are connected by the shaft 109, provide reaction in the steer units 22 and 24. One of the sun gears 124 and 126 is driven in one direction and the other of these sun gears is driven in the opposite direction at the same speed by the gear train connection therebetween which is receiving drive from the hydrostatic steer drive unit 26. The carriers 114 and 121 and thus output shafts 12 and 14 are driven at reduced speed relative to these driving sun gears and in the same direction as their driving sun gear. Thus, the output shafts 12 and 14 are driven at the same speed in opposite directions and thereby produce steering; the direction of vehicle turning being determined by the rotational direction of shaft 130.

In the immediately following operational description of the four speed range drives provided, the hydrostatic steer drive unit 26 is conditioned so that it does not power shaft 130, the description of steering operation in all speed range drives being deferred until later. In the lowest and first speed range drive, either the forward drive clutch 80 or reverse drive clutch 78 is engaged, the clutch 61 is engaged, and all other drive establishing devices are disengaged. Reference will be made to FIG. 2 which illustrates typical speed characteristics of certain transmission components, the speed of these components being plotted along the ordinate and vehicle speed being plotted along the abscissa with a positive speed (+) indicating that the component is rotating in what will be described as the forward direction and a negative speed (−) indicating opposite or reverse rotation. For ease in understanding, it will be assumed that the engine 10 operates at a constant speed as indicated by line 136 in FIG. 2 and thus the pump input shaft 42 of the hydrostatic propulsion drive unit 18 is driven at a constant but lower speed because of the gear reduction provided as indicated by line 137. This pump input speed will be assumed to be its maximum value. Vehicle speed is proportional to the speed of shaft 62 which is indicated by line 138. The remaining line 139 indicates the speed of motor output shaft 50 of the hydrostatic propulsion drive unit 18. In the first speed range drive with clutch 61 engaged, forward transmission drive which produced forward vehicle drive is obtained by operating the hydrostatic propulsion drive unit 18 to power the motor output shaft 50 and thus sun gear 51 of gear set 54 in the reverse direction as indicated by line 139 in FIG. 2. Since carrier 59 is grounded, the ring gear 60 and thus the clutch connected shaft 62 are caused to rotate in the opposite or forward direction at a reduced speed. Shaft 62 drives shaft 109 and connected ring gears 111 and 118 of the steer units in the reverse direction through the gear train provided by gears 107 and 108. The gear train between sun gears 124 and 126 of the steer units causes these sun gears to provide reaction. The pinions 112 and 119 thus walk about sun gears 124 and 126 to drive carriers 114 and 121 and connected output shafts 12 and 14, respectively, in the reverse direction at a reduced speed, this reverse direction producing forward vehicle motion since in this particular application there is direction reversal in the final drives to the tracks' drive sprockets. Thus, output speed in the first speed range forward drive is increased by increasing the motor speed of the hydrostatic propulsion drive unit to its maximum value in the reverse direction as indicated by line 139 which maximum value will be assumed to be maximum pump speed.

During operation in the first speed range forward drive, the sun gear 52 of gear set 55 is rotating with the hydrostatic propulsion motor output shaft 50 in the reverse direction and the carrier 66 of this gear set is rotating in the opposite or forward direction with shaft 62. Sun gear 52 and carrier 66 cooperatively drive ring gear 68 and thus carrier 91 of gear set 74 in the forward direction. Prior to an upshift in forward drive, the forward drive clutch 80 is engaged to drive shaft 86 in the forward direction. Thus, sun gear 87 of gear set 74 is driven in the forward direction the same as carrier 91 so that the speed component of carrier 91 subtracts from that of sun gear 87 in the drive they cooperatively produce to driven ring gear 92 in the reverse direction in the first speed range forward drive. This arrangement enables the sizes of the operating gears to be selected so that at maximum hydrostatic propulsion motor speed, the speed of ring gear 92 in the reverse direction in the first speed range forward drive is reduced to zero so that there is no relative speed between the members of brake 94 and thus this brake is speed synchronized.

A shift from first to a second speed range forward drive is preferably accomplished when the above speed synchronous condition of brake 94 is reached in the first speed range forward drive. The clutch 61 is released and the brake 94 is engaged while the forward drive clutch 80 remains engaged. The gear set 54 then becomes passive since it has no reaction and remains so throughout the higher speed range drives subsequently described. The permanent grounding of carrier 59 and taking the drive off gear set 54 through clutch 61 is preferred since the components of this gear set are thereby prevented from obtaining high rotational velocity which would occur if, for example, the carrier 59 was braked and the ring gear 60 was continuously connected to shaft 62. Thus, high centrifugal loadings in the bearings and structure of the preferred arrangement of this gear set are prevented when this gear set is passive. In the second speed range forward drive, power is transmitted hydrostatically to drive sun gear 52 of gear set 55 in the reverse direction and mechanical drive is now provided from the transmission input to drive ring gear 68 in the forward direction, this mechanical drive being through gear set 74 with brake 94 engaged so that sun gear 87 drives carrier 91 and connected ring gear 68 in the forward direction at reduced speed. The mechanical drive and hydrostatic drive are combined by gear set 55 to continue driving shaft 62 in the forward direction. In the second speed range forward drive the reverse speed component of sun gear 52 subtracts from the forward speed component of ring gear 68 in the drive they cooperatively provide to carrier 66 to drive shaft 62 in the forward direction and thus drive output shafts 12 and 14 in the reverse direction. Thus, transmission output speed in the second speed range forward drive is now increased by reducing hydrostatic propulsion motor speed to zero and then increasing the speed to maximum motor speed in the forward direction as indicated by line 139 in FIG. 2, the forward motor speed providing sun gear 52 with an additive speed component. Downshifting from the second speed range forward drive to the first speed range forward drive also occurs with a speed synchronous condition at clutch 61 by the drive to the driven member of this clutch from shaft 62 and the drive to the drive member of this clutch from sun gear 51 via pinions 58 and ring gear 60.

During operation in the last half of the second speed range forward drive, the sun gear 53 of gear set 56 is being driven in the forward direction by the hydrostatic propulsion motor 48 and the ring gear 71 of this gear set is rotating with shaft 62 in the same direction. These rotations of sun gear 53 and ring gear 71 cause carrier 70 of gear set 56 and connected carrier 101 of gear set 75 to rotate in the forward direction. At the same time, sun gear 98 of gear set 75 is being driven in the forward direction the same as carrier 101. The sun gear 98 and carrier 101 cooperatively drive ring gear 104 in the forward direction at a speed which reduces as hydrostatic propulsion motor speed increases to its maximum value in the forward direction in the last half of the second speed range forward drive. This arrangement enables the sizes of the operating gears to be selected so that at maximum hydrostatic propulsion motor speed in the forward direction in the second speed range drive, the speed of ring gear 104 is reduced to zero so that the members of the brake 106 are speed synchronized in that they have no relative speed.

The shift from second to a third speed range forward drive is preferably accomplished when the above speed synchronous condition of brake 106 is reached in the second speed range forward drive The brake 94 is released and the brake 106 is engaged while the forward drive clutch 80 remains engaged. Mechanical drive and hydrostatic drive are now combined by gear set 56, the mechanical drive being provided through gear set 75 with its input driven sun gear 98 which drives the carrier 101 and connected carrier 70 at reduced speed. Thus sun gear 53 rotates in the forward direction at the initiation of this transmission drive and therefore the speed of the hydrostatic propulsion motor drive subtracts from that of the carrier 70 in the drive they cooperatively provide to drive ring gear 71 and connected shaft 62 in the forward direction and thus drive the transmission output shafts 12 and 14. Thus, output speed in the third speed range forward drive is increased by reducing hydrostatic propulsion motor speed from the maximum value in the forward direction to zero and then increasing this speed to the maximum value in the reverse direction. Downshifting from third to the second speed range forward drive also occurs with a speed synchronous condition at brake 94 by the drive to ring gear 92 of gear set 74 in the third speed range forward drive.

During operation in the last half of the third speed range forward drive, the sun gear 52 of gear set 55 is rotating in the reverse direction and carrier 66 is rotating in the forward direction with shaft 62. The sun gear 52 and carrier 66 with these rotations cooperate to drive ring gear 68 and thus the driven member of clutch 96 in the same direction that the drive member of this clutch is being driven by shaft 86, this direction being forward. This arrangement enables the sizes of the operating gears to be selected so that at the maximum hydrostatic propulsion motor in the reverse direction in the third speed range forward drive, there is no relative speed between the members of clutch 96 and therefore this clutch is speed synchronized.

The shift from third to a fourth speed range forward drive in forward and reverse is preferably accomplished when the above speed synchronous condition of clutch 96 is reached in third speed range forward drive. The brake 106 is released and clutch 96 is engaged while the forward drive clutch 80 remains engaged. Mechanical drive and hydrostatic drive are now combined by gear set 55 and by the arrangement of the drive connections of this gear set, the speed of sun gear 52 subtracts from that of the ring gear 68 at the initiation of the drive they cooperatively provide to drive shaft 62 in the forward direction and thus drive the transmission output shafts 12 and 14. Thus, transmission output speed in the fourth speed range forward drive is increased by reducing hydrostatic propulsion motor speed from its maximum value in the reverse direction to zero and then increasing this speed to the maximum value in the forward direction. Downshifting from the fourth speed range forward drive to the third speed range forward drive also occurs with a speed synchronous condition at brake 106 by the drive to ring gear 104 of gear set 75 in the fourth speed range forward drive.

Four speed range drives with synchronous shifting are also provided in reverse. This is effected by engaging the reverse drive clutch 78 instead of the forward drive clutch 80, operating the hydrostatic propulsion drive unit 18 to produce the inverted image of line 139 and operating the mechanical drive establishing devices as described previously. Thus, the reverse drives provide the same speed range coverage as the forward drives.

Describing now the steering operation, in all of the speed range drives in both forward and reverse, steering of the differential type is provided by operation of the hydrostatic steer drive unit 26 to drive shaft 130. With shaft 130 now being driven in either the forward or reverse direction, the sun gears 124 and 126 which provided only reaction before are now caused to rotate in opposite directions at the same speed. For example, when sun gear 124 is driven in the same direction as ring gear 111 by the hydrostatic steer drive unit 26, its speed component adds to that of ring gear 111 and thus increases the speed of output shaft 12 while the speed component of sun gear 126 subtracts from that of ring gear 118 to decrease the speed of output shaft 14 by the same amount that the speed shaft 12 has been increased. Alternatively, the speed of output shaft 14 can be increased while the speed of output shaft 14 is decreased to steer in the opposite direction.

It will be understood that while the transmission has been illustrated with dual output for use in a track-laying vehicle, the transmission can also be adapted to a vehicle requiring only one transmission output. This may be accomplished by taking output directly from either shaft 62 or shaft 109, the shaft thus used then serving as the transmission's output shaft.

The above-described preferred embodiment is illustrative of the invention which may be modified within the scope of the appended claims.

I claim:

1. In a transmission the combination of an input shaft; and output shaft; variable speed ratio hydrostatic drive means drivingly connected to said input shaft; first planetary gear means including selectively operable first drive establishing means for selectively drivingly connecting said hydrostatic drive means to said output shaft to provide a first speed range drive between said input shaft and said output shaft; second planetary gear means drivingly connected to both said hydrostatic drive means and said output shaft; mechanical drive train means including selectively operable second drive establishing means for selectively drivingly connecting said input shaft to said second planetary gear means whereby said second planetary gear means combines power from said input shaft and said hydrostatic drive means to provide a second speed range drive between said input shaft and said output shaft and whereby the speed ratio in both said speed range drives is varied by varying the speed ratio of said hydrostatic drive means; each said planetary gear means comprising a sun gear, a ring gear and a carrier carrying a pinion meshing with said sun gear and said ring gear; the sun gear of both of said first and second planetary gear means drivingly connected to said hydrostatic drive means; means grounding the carrier of said first planetary gear means; said first drive establishing means comprising a clutch operable to drivingly connect the ring gear of said first planetary gear means to said output shaft; the carrier of said second planetary gear means drivingly connected to said output shaft; and said mechanical drive train means operable to drivingly connect said input shaft to the ring gear of said second planetary gear means.

2. In a transmission the combination of an input shaft; an output shaft; variable speed ratio hydrostatic drive means drivingly connected to said input shaft; first planetary gear means including selectively operable first drive establishing means for selectively drivingly connecting said hydrostatic drive means to said output shaft to provide a first speed range drive between said input shaft and said output shaft; second planetary gear means drivingly connected to both said hydrostatic drive means and said output shaft; mechanical drive train means including planetary gear means and selectively operable second drive establishing means for selectively drivingly connecting said input shaft to said second planetary gear means whereby said second planetary gear means combines power from said input shaft and said hydrostatic drive means to provide a second speed range drive between said input shaft and said output shaft and whereby the speed ratio in both said speed range drives is varied by varying the speed ratio of said hydrostatic drive means; each said planetary gear means comprising a sun gear, a ring gear and a carrier carrying a pinion meshing with said sun gear and said ring gear; the sun gear of both said first and second planetary gear means drivingly connected to said hydrostatic drive means; means grounding the carrier of said first planetary gear means; said first drive establishing means comprising a clutch operable to drivingly connect the ring gear of said first planetary gear means to said output shaft; the carrier of said second planetary gear means drivingly connected to said output shaft; and said mechanical drive train means operable to drivingly connect said input shaft to the ring gear of said second planetary gear means.

3. In a transmission the combination of an input shaft; an output shaft; variable speed ratio hydrostatic drive means drivingly connected to said input shaft; first planetary gear means including selectively operable first drive establishing means for selectively drivingly connecting said hydrostatic drive means to said output shaft to provide a first speed range drive between said input shaft and said output shaft; second planetary gear means drivingly connected to both said hydrostatic drive means and said output shaft; first mechanical drive train means including selectively operable second drive establishing means for selectively drivingly connecting said input shaft to said second planetary gear means whereby said second planetary gear means combines power from said input shaft and said hydrostatic drive means to provide a second speed range drive between said input shaft and said output shaft; third planetary gear means operatively drivingly connected to both said hydrostatic drive means and said output shaft; second mechanical drive train means including selectively operable third drive establishing means for selectively drivingly connecting said input shaft to said third planetary gear means whereby said third planetary gear means combines power from said input shaft and said hydrostatic drive means to provide a third speed range drive between said input shaft and said output shaft and whereby the speed ratio in all said speed range drives is varied by varying the speed ratio of said hydrostatic drive means; and forward and reverse drive means for selectively providing a forward drive and a reverse drive between said input shaft and all said mechanical drive train means.

4. In a transmission the combination of an input shaft; an output shaft; variable speed ratio hydrostatic drive means drivingly connected to said input shaft; first planetary gear means including selectively operable first drive establishing means for selectively drivingly connecting said hydrostatic drive means to said output shaft to provide a first speed range drive between said input shaft and said output shaft; second planetary gear means drivingly connected to both said hydrostatic drive means and said output shaft; first mechanical drive train means including selectively operable second drive establishing means for selectively drivingly connecting said input shaft to said second planetary gear means whereby said second planetary gear means combines power from said input shaft and said hydrostatic drive means to provide a second speed range drive between said input shaft and said output shaft; third planetary gear means operatively drivingly connected to both said hydrostatic drive means and said output shaft; second mechanical drive train means including selectively operable third drive establishing means for selectively driving connecting said input shaft to said third planetary gear means whereby said third planetary gear means combines power from said input shaft and said hydrostatic drive means to provide a third speed range drive between said input shaft and said output shaft and whereby the speed ratio in all said speed range drives is varied by varying the speed ratio of said hydrostatic drive means; forward and reverse drive means for selectively providing a forward drive and a reverse drive between said input shaft and all said mechanical drive train means; a pair of steer planetary gear means each having a sun gear member, a ring gear member and a carrier member carrying a pinion meshing with said sun gear member and said ring gear member; means drivingly connecting said output shaft to one pair of like members of said steer planetary gear means; direction reversing gear train means operatively connecting another pair of like members of said steer planetary gear means; and variable speed ratio steer hydrostatic drive means for operatively drivingly connecting said input shaft to said another pair of like members of said steer planetary gear means whereby the remaining pair of like members of said steer planetary gear means provide two output drives having equal speed on establishment of said speed range drives with a differential speed effected between said output drives to produce steering whenever said steer hydrostatic drive means drives said direction reversing gear train wherein said differential speed is varied by varying the speed ratio of said steer hydrostatic drive means.

5. In a transmission the combination of an input shaft; an output shaft; variable speed ratio hydrostatic drive means drivingly connected to said input shaft; first planetary gear means including selectively operable first drive establishing means for selectively drivingly connecting said hydrostatic drive means to said output shaft to provide a first speed range drive between said input shaft and said output shaft; second planetary gear means drivingly connected to both said hydrostatic drive means and said output shaft; first mechanical drive train means including selectively operable second drive establishing means for selectively drivingly connecting said input shaft to said second planetary gear means whereby said second planetary gear means combines power from said input shaft and said hydrostatic drive means to provide a second speed range drive between said input shaft and said output shaft; third planetary gear means operatively drivingly connected to both said hydrostatic drive means and said output shaft; second mechanical drive train means including selectively operable third drive establishing means for selectively drivingly connecting said input shaft to said third planetary gear means whereby said third planetary gear means combines power from said input shaft and said hydrostatic drive means to provide a third speed range drive between said input shaft and said output shaft and whereby the speed ratio in all said speed range drives is varied by varying the speed ratio of said hydrostatic drive means; each said planetary gear means comprising a sun gear, a ring gear and a carrier carrying a pinion meshing with said sun gear and said ring gear; the sun gear of each said planetary gear means drivingly connected to said hydrostatic drive means; means grounding the carrier of said first planetary gear means; said first drive establishing means comprising a clutch operable to drivingly connect the ring gear of said first planetary gear means to said output shaft; both the carrier of said second planetary gear means and the ring gear of said third planetary gear means drivingly connected to said output shaft; said first mechanical drive train means operable to drivingly connect said input shaft to the ring gear of said second planetary gear means; and said second mechanical drive train means operable to drivingly connect said input shaft to the carrier of said third planetary gear means.

6. In a transmission the combination of an input shaft; an output shaft; variable speed ratio hydrostatic drive means drivingly connected to said input shaft; first planetary gear means including selectively operable first drive establishing means for selectively drivingly connecting said hydrostatic drive means to said output shaft to provide a first speed range drive between said input shaft and said output shaft; second planetary gear means drivingly connected to both said hydrostatic drive means and said output shaft; first mechanical drive train means including selectively operable second drive establishing means for selectively drivingly connecting said input shaft to said second planetary gear means whereby said second planetary gear means combines power from said input shaft and said hydrostatic drive means to provide a second speed range drive between said input shaft and said output shaft; third planetary gear means operatively drivingly connected to both said hydrostatic drive means and said output shaft; second mechanical drive train means including selectively operable third drive establishing means for selectively drivingly connecting said input shaft to said third planetary gear means whereby said third planetary gear means combines power from said input shaft and said hydrostatic drive means to provide a third speed range drive between said input shaft and said output shaft and whereby the speed ratio in all said speed range drives is varied by varying the speed ratio of said hydrostatic drive means; each said planetary gear means comprising a sun gear, a ring gear and a carrier carrying a pinion meshing with said sun gear and said ring gear; the sun gear of each said planetary gear means drivingly connected to said hydrostatic drive means; means grounding the carrier of said first planetary gear means; said first drive establishing means comprising a clutch operable to drivingly connect the ring gear of said first planetary gear means to said output shaft; both the carrier of said second planetary gear means and the ring gear of said third planetary gear means drivingly connected to said output shaft; said first mechanical drive train means operable to drivingly connect said input shaft to the ring gear of said second planetary gear means; said second mechanical drive train means operable to drivingly connect said input shaft to the carrier of said third planetary gear means; said first mechanical drive train means including fourth planetary gear means; said second drive establishing means comprising a first brake operable to cause said fourth planetary gear means to provide the drive connection between said input shaft and the ring gear of said second planetary gear means; said second mechanical drive train means including fifth planetary gear means; and said third drive establishing means comprising a second brake operable to cause said fifth planetary gear means to provide the drive connection between said input shaft and the carrier of said third planetary gear means.

7. In a transmission the combination of an input shaft; an output shaft; variable speed ratio hydrostatic drive means drivingly connected to said input shaft; first planetary gear means including selectively operable first drive establishing means for selectively drivingly connecting said hydrostatic drive means to said output shaft to provide a first speed range drive between said input shaft and said output shaft; second planetary gear means drivingly connected to both said hydrostatic drive means and said output shaft; first mechanical drive train means including selectively operable second drive establishing means for selectively drivingly connecting said input shaft to said second planetary gear means whereby said second planetary gear means combines power from said input shaft and said hydrostatic drive means to provide a second speed range drive between said input shaft and said output shaft; third planetary gear means operatively drivingly connected to both said hydrostatic drive means and said output shaft; second mechanical drive train means including selectively operable third drive establishing means for selectively drivingly connecting said input shaft to said third planetary gear means whereby said third planetary gear means combines power from said input shaft and said hydrostatic drive means to provide a third speed range drive between said input shaft and said output shaft and whereby the speed ratio in all said speed range drives is varied by varying the speed ratio of said hydrostatic drive means; each said planetary gear means comprising a sun gear, a ring gear and a carrier carrying a pinion meshing with said sun gear and said ring gear; the sun gear of each said planetary gear means drivingly connected to said hydrostatic drive means; means grounding the carrier of said first planetary gear means; said first drive establishing means comprising a clutch operable to drivingly connect the ring gear of said first planetary gear means to said output shaft; both the carrier of said second planetary gear means and the ring gear of said third planetary gear means drivingly connected to said output shaft; said first mechanical drive train means operable to drivingly connect said input shaft to the ring gear of said second planetary gear means; said second mechanical drive train means operable to drivingly connect said input shaft to the carrier of said third planetary gear means; said first mechanical drive train means including fourth planetary gear means; said second drive establishing means comprising a first brake operable to cause said fourth planetary gear means to provide the drive connection between said input shaft and the ring gear of said second planetary gear means; said second mechanical drive train means including fifth planetary gear means; said third drive establishing means comprising a second brake operable to cause said fifth planetary gear means to provide the drive connection between said input shaft and the carrier of said third planetary gear means; and a clutch for selectively locking up said fourth planetary gear means to drivingly connect said input shaft to the ring gear of said second planetary gear means with a speed ratio drive different than that provided on engagement of said first brake whereby said second planetary gear means combines power from said input shaft and said hydrostatic drive means to provide a fourth speed range drive between said input shaft and said output shaft and wherein the speed ratio in said fourth speed range drive is varied by varying the speed ratio of said hydrostatic drive means.

8. In a transmission the combination of an input shaft; an output shaft; variable speed ratio hydrostatic drive means drivingly connected to said input shaft; first planetary gear means including selectively operable first drive establishing means for selectively drivingly connecting said hydrostatic drive means to said output shaft to provide a first speed range drive between said input shaft and said output shaft; second planetary gear means drivingly connected to both said hydrostatic drive means and said output shaft; first mechanical drive train means including selectively operable second drive establishing means for selectively drivingly connecting said input shaft to said second planetary gear means whereby said second planetary gear means combines power from said input shaft and said hydrostatic drive means to provide a second speed range drive between said input shaft and said output shaft; third planetary gear means operatively drivingly connected to both said hydrostatic drive means and said output shaft; and second mechanical drive train means including selectively operable third drive establishing means for selectively drivingly connecting said input shaft to said third planetary gear means whereby said third planetary gear means combines power from said input shaft and said hydrostatic drive means to provide a third speed range drive between said input shaft and said output shaft and whereby the speed ratio in all said speed range drives is varied by varying the speed ratio of said hydrostatic drive means.

PO-1050
(5/69)

UNITED STATES PATENT OFFICE
CERTIFICATE OF CORRECTION

Patent No. 3,596,535      Dated August 3, 1971

Inventor(s) James C. Polak

It is certified that error appears in the above-identified patent and that said Letters Patent are hereby corrected as shown below:

Column 1, line 3, insert -- The invention herein described was made in the course of work under a contract or subcontract thereunder with the Department of the Army. --. Column 2, line 8, "units's" should read -- unit's --; line 29, "units" should read -- unit --. Column 4, line 49, "driven" should read -- drive --. Column 6, line 62, "and" should read -- an --.

Signed and sealed this 21st day of March 1972.

(SEAL)
Attest:

EDWARD M. FLETCHER, JR.
Attesting Officer

ROBERT GOTTSCHALK
Commissioner of Patents